(12) United States Patent
Bergkvist et al.

(10) Patent No.: US 10,678,221 B2
(45) Date of Patent: Jun. 9, 2020

(54) STORAGE OF OBJECT DATA IN DEVICE FOR DETERMINATION OF OBJECT POSITION

(71) Applicant: Sony Mobile Communications Inc., Tokyo (JP)

(72) Inventors: Hannes Bergkvist, Helsingborg (SE); Mattias Falk, Lund (SE)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 15/873,023

(22) Filed: Jan. 17, 2018

(65) Prior Publication Data
US 2018/0231958 A1 Aug. 16, 2018

(30) Foreign Application Priority Data

Feb. 14, 2017 (EP) .................................. 17156067

(51) Int. Cl.
| | |
|---|---|
| *G05B 19/418* | (2006.01) |
| *G05B 19/402* | (2006.01) |
| *G01S 5/00* | (2006.01) |
| *B25J 9/16* | (2006.01) |

(52) U.S. Cl.
CPC ........ *G05B 19/4183* (2013.01); *G01S 5/0009* (2013.01); *G05B 19/402* (2013.01); *G05B 19/41865* (2013.01); *B25J 9/1694* (2013.01); *G05B 2219/31086* (2013.01); *G05B 2219/31095* (2013.01); *G05B 2219/31283* (2013.01); *G05B 2219/31286* (2013.01); *G05B 2219/31432* (2013.01); *G05B 2219/37002* (2013.01); *G05B 2219/49302* (2013.01); *Y02P 90/10* (2015.11)

(58) Field of Classification Search
None
See application file for complete search history.

(56) References Cited

U.S. PATENT DOCUMENTS

| | | | | |
|---|---|---|---|---|
| 4,831,540 | A * | 5/1989 | Hesser | B07C 3/12 700/113 |
| 6,094,793 | A * | 8/2000 | Szuba | G05B 19/4083 198/345.3 |
| 7,490,710 | B1 * | 2/2009 | Weskamp | B23Q 7/1426 198/345.3 |
| 2005/0055127 | A1 * | 3/2005 | Swain | B23Q 9/00 700/186 |
| 2005/0138439 | A1 * | 6/2005 | Rothman | G01S 5/14 713/300 |
| 2006/0200261 | A1 | 9/2006 | Monette | |

(Continued)

FOREIGN PATENT DOCUMENTS

EP 1582952 A2 10/2005

OTHER PUBLICATIONS

Extended European Search Report from corresponding European Patent Application No. 17156067, dated May 30, 2017.

*Primary Examiner* — Thomas C Lee
*Assistant Examiner* — Gary Collins
(74) *Attorney, Agent, or Firm* — Tucker Ellis LLP

(57) ABSTRACT

Signals are transmitted between a device placed on an object and at least one further device. Based on measurement of the signals transmitted between the device and the at least one further device, a position of the object is determined. Further, data associated with the object are stored in the device. The stored data are then transmitted from the device.

16 Claims, 5 Drawing Sheets

(56) References Cited

U.S. PATENT DOCUMENTS

| | | | |
|---|---|---|---|
| 2007/0282678 A1* | 12/2007 | Dendi | G06Q 30/02 |
| | | | 705/14.11 |
| 2009/0175694 A1* | 7/2009 | Craig | B23B 51/00 |
| | | | 407/37 |
| 2010/0212565 A1* | 8/2010 | Clayman | A41H 42/00 |
| | | | 112/475.09 |
| 2013/0021145 A1* | 1/2013 | Boudy | G08B 13/1427 |
| | | | 340/426.11 |
| 2013/0060520 A1* | 3/2013 | Amor | G01C 5/008 |
| | | | 702/154 |
| 2016/0031133 A1* | 2/2016 | Osterday | B29C 44/60 |
| | | | 264/40.7 |
| 2016/0257075 A1* | 9/2016 | Levine | G05B 15/02 |
| 2016/0321481 A1* | 11/2016 | Bottazzi | G06K 7/10435 |
| 2017/0022015 A1* | 1/2017 | Gollu | G05B 15/02 |

* cited by examiner

STORAGE OF OBJECT DATA IN DEVICE FOR DETERMINATION OF OBJECT POSITION

RELATED APPLICATION DATA

This application claims the benefit of European Patent Application No. 17 156 067.5, filed Feb. 14, 2017, the disclosure of which is incorporated herein by reference in its entirety.

FIELD OF THE INVENTION

The present invention relates to methods for supporting handling of an object and to corresponding devices and systems.

BACKGROUND OF THE INVENTION

For example in the fields of robotics or logistics, objects are handled by mostly automated processes. Such objects may for example correspond to a product which is subjected to various manufacturing processes, such as machining or assembly, or to various logistic processes, such as packaging or shipment. For supporting such handling, various kinds of information concerning the objects are needed. For example, a robot used for processing of a certain object may need to be provided with information about the object, such as dimensions, type of material, or the like.

One way to provide such information concerning an object is to attach an RFID (Radio Frequency Identification) tag to the object. The RFID tag provides a unique identity of the object, and can be used for obtaining information about the object from a database. However, this may result in significant effort to build and maintain the database. By way of example, such database may need to be provided with access to various kinds of systems that might be used for handling various kinds of objects, and for each object the database may need to be manually configured.

Accordingly, there is a need for technologies which overcome the above-mentioned problems and allow for efficiently supporting handling of an object.

SUMMARY OF THE INVENTION

According to an embodiment, a method of supporting handling of an object is provided. According to the method, signals are transmitted between a device placed on the object and at least one further device. Based on measurement of the signals transmitted between the device and the at least one further device a position of the object is determined. Further, data associated with the object are stored in the device. The stored data are then transmitted from the device. Accordingly, the device may at the same time be used for enabling position measurements for the object and for storing and transmitting information about the object, which can then be used in various stages of processing or otherwise handling the object. The device may for example be implemented as a positioning beacon or a positioning receiver which is additionally configured to store and transmit object data.

According to an embodiment, the transmitting of the stored data by the device is controlled depending on the determined position of the object. In this way, information about the object can be transmitted in a position dependent manner. For example, if the position of the object indicates that the object is at a certain processing site, the device may transmit a part of the stored data which includes information which is to be used as a basis for controlling processing of the object. For example, the transmitted information could then indicate processing steps which are to be performed on the object. In a similar manner, the storing of the data in the device may be controlled based on the determined position of the object. For example, this may involve storing information about processes which have been performed on the object.

According to an embodiment, the stored data are organized in multiple data blocks. Depending on the determined position of the object, at least one of the data blocks is selected. The device is then controlled to transmit the stored data from the selected at least one data block. By organizing the stored data in multiple data blocks which are selected in a position dependent manner, the position dependent transmitting and/or storage of information may be implemented in an efficient manner. Further, this may enable certain data security mechanisms. For example, access to certain data blocks might be admitted during manufacturing processes, but access to these data blocks could be blocked during later shipment related processes. In this way, information used during manufacturing may be kept confidential.

According to an embodiment, the data stored in the device are updated based on processing of the object. In this way, the stored data may be efficiently used for documenting a processing history of the object. This may for example enable utilizing information from earlier processing stages when further processing the object.

According to an embodiment, a device is provided. The device comprises a positioning interface configured for transmission of signals between the device and at least one further device. Further, the device comprises a processor configured to determine, based on measurement of the signals transmitted between the device and at least one further device, a position of an object on which the device is placed. Further, the device comprises a memory configured to store data associated with the object. Further, the device comprises a data interface configured for transmitting the stored data from the device. According to an embodiment, the data interface is further configured for receiving the data to be stored.

The processor may be configured to control the device to operate according to a method as described above.

According to an embodiment, the processor is thus configured to control the transmitting of the stored data by the device depending on the determined position of the object. Further, the processor is thus configured to control the storing of the data in the device based on the determined position of the object.

According to an embodiment, the stored data are organized in multiple data blocks. The processor may then be configured to select at least one of the data blocks depending on the determined position of the object. Further, the processor may be configured to control the transmission of the data in such a way that the device transmits the stored data from the selected at least one data block.

According to an embodiment, the processor may be configured to update the data stored in the device based on processing of the object.

According to a further embodiment, a system is provided. The system comprises at least one device according to any one of the above embodiments. Further, the system comprises at least one other device for receiving the stored data transmitted by the device and/or for providing at least a part of the data to be stored in the device.

According to an embodiment, the stored data comprise information on one or more characteristics of the object.

Such characteristics may include various physical properties of the object, such as weight, dimensions, constituent material(s). In some embodiments, the information on the characteristics of the object could also include a model description of the object, e.g., in the form of a two- or three-dimensional geometric model description. This information may significantly facilitate handling of the object because processes used in handling of the object may be adapted to the characteristics of the object.

According to an embodiment, the stored data comprise information concerning processing of the object. For example, the information concerning processing of the object may define one or more processing steps to be performed on the object, such as cutting the object, drilling a hole into the object, chemical treatment of the object, assembly of the object with one or more other objects, packaging of the object, or the like.

According to an embodiment of the above method, device or system, the stored data comprise data for programming a robot for processing the object. For example, the data for programming the robot could define a sequence of robotic actions which are needed for processing the object. The data stored in the device may thus allow for efficiently managing programming of various robots needed to process the object. For example, before starting the processing of a certain object, the robot may be automatically reprogrammed with programming which is individually tailored to this object.

According to an embodiment of the above method, device or system, the stored data comprise information concerning a location of the object. For example, while the object is being stored in a storage facility, the stored data could identify the detailed location within the storage facility, e.g., in terms of a shelf section or storage bay. This may facilitate picking up the object from storage.

According to an embodiment of the above method, device or system, the signals transmitted between the device and the further device comprise ultrasound signals, radio signals, and/or radar signals. These signals may enable precise measurement of positions, without requiring line-of-sight conditions or favorable light conditions. However, it is to be understood that other electromagnetic or acoustic signals could be used as well.

In the above method, device or system, the signals may be transmitted from the further device to the device. Accordingly, the device may act as a receiver of the signals. Alternatively or in addition, the signals may be transmitted from the device to the further device. The device may thus also act as a transmitter of the signals. In some scenarios, signals from the further device to the device and signals from the device to the further device may also be used in combination.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to scenarios where a position, and optionally also orientation of an object are determined, based one measurements of signals transmitted between a device placed on the object and a further device. In the illustrated examples, the device is assumed to be a positioning tag or marker in the form of a compact size device which can be removably or permanently attached to the object, e.g., by a glue, screw fixation, suction effect, or by magnetic force. The position determined in this way may be used for various purposes, e.g., for controlling a robot which is used for handling the object, e.g., in the course of manufacturing, packaging, or otherwise processing of a product. In addition to enabling measurement of the position, the device is also used for storing data associated with the object. These data will in the following also be referred to as workobject data (WO data). The WO data may for example include information on characteristics of the object, such as dimensions, weight, constituent material(s), or a geometric model description of the object. Further, the WO data may include information related to processing of the object, e.g., information about processing steps to be performed on the object, information about processing steps to be performed on the object already performed on the object, data for programming of a robot for processing the object, or the like. Further, the WO data may include information about a location of the object, e.g., an identifier of a shelf section or storage bay. The device placed on the object transmits the stored data so that the stored data can be received by various devices or systems involved in handling of the object. The device may transmit the WO data in a position dependent manner. That is to say, depending on the position of the object as determined on the basis of the measurements of the signals, the device may select different parts of the stored WO data for transmission. Further, the stored WO data may be updated in the course of processing the object. Also the updating of the WO data may be accomplished in a position dependent manner.

Figure 1:
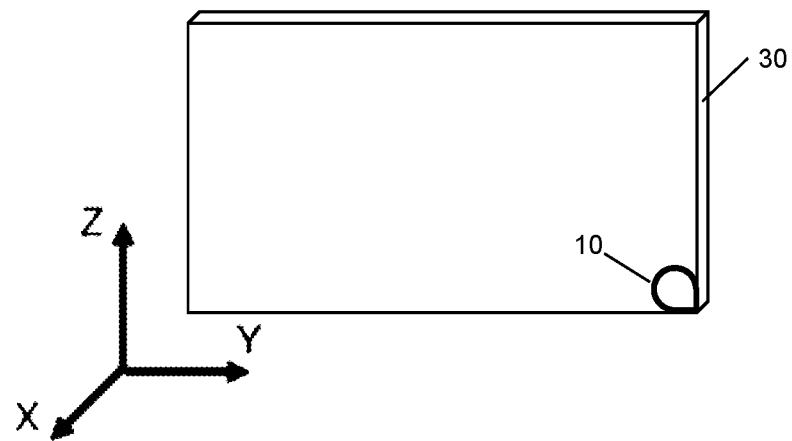
FIG. 1 schematically illustrates utilization of a device according to an embodiment of the invention.

FIG. 1 shows an exemplary scenario where a positioning tag 10 as outlined above is placed on an object 30. In the illustrated example, the object 30 is assumed to be a rectangular shaped plate, e.g., to be used as an element in construction of an apparatus. As illustrated, the positioning tag 10 is attached to the object 30. The positioning tag 10 is placed in a well-defined position and orientation on the object 30. This is achieved by bringing a reference feature of the positioning tag 10 into alignment with a reference feature of the object 30. In the illustrated example, the positioning tag 10 is substantially disc shaped with a triangular shaped corner which forms the reference feature of the positioning tag 10. As illustrated, the triangular shaped corner of the positioning tag 10 can be brought into alignment with one of the outer corners of the object 30. In this way, the positioning tag 10 is placed in a well-defined position and orientation on the object 30. This well-defined position helps to deduce the position and orientation of the object 30 from a position and orientation of the positioning tag 10. However, it is noted that in some usage scenarios a specific way of placing the positioning tag 10 on the object 30 might not be required. For example, in some cases, the position and optionally also the orientation of the positioning tag 10 may be directly used as an estimate of the position and optionally also orientation of the object 30, e.g., if the object 30 is relatively small so that impact of different possibilities of placing the positioning tag on the object 30 on accuracy of the determination of the position and orientation is negligible. The position and optionally also orientation of the object 30 may be represented as coordinates in a coordinate system, e.g., an x-y-z-coordinate system as illustrated in FIG. 1.

As will be further explained in the following, measurements of signals transmitted to or from the positioning tag 10 placed on the object 30 may then be used for determining the position, and optionally also orientation, of the object 30.

Figure 2:
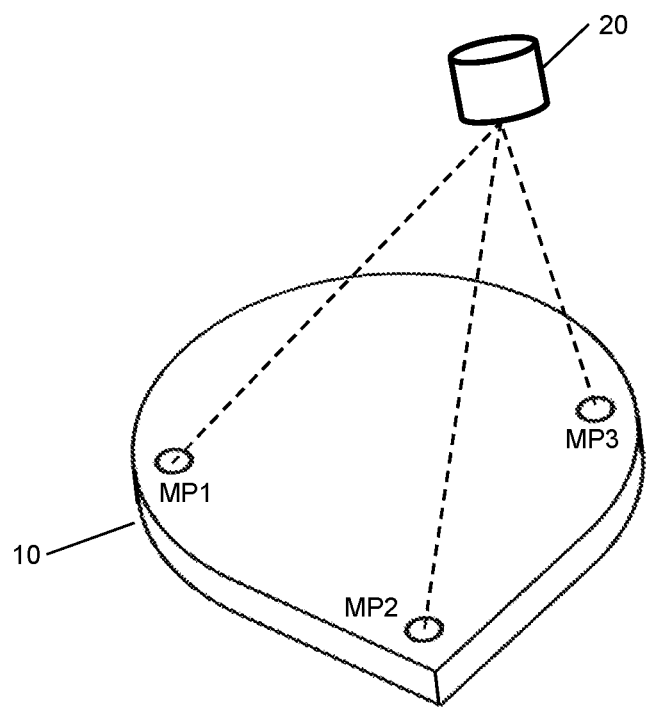
FIG. 2 schematically illustrates positioning measurements with a device according to an embodiment of the invention.

As further illustrated in FIG. 2, the positioning tag 10 includes multiple measurement points MP1, MP2, MP3. These measurement points MP1, MP2, MP3 have a well-defined arrangement on the positioning tag 10. For example, the arrangement could be represented by local coordinates of the measurement points MP1, MP2, MP3, and these local coordinates could be defined with respect to the reference feature of the positioning tag 10. At each of these measurement points MP1, MP2, MP3, the positioning tag 10 receives a signal transmitted from a further device 20. On the basis of the received signals, the positioning tag 10 measures the position of each measurement point 11 in the given coordinate system, e.g., using run-time based distance measurements, triangulation calculations, and/or trilateration calculations for each of the measurement points MP1, MP2, MP3. Here, it is noted that for each of the measurement points MP1, MP2, MP3, multiple measurements may need to be performed in order to measure the position of the measurement point MP1, MP2, MP3. This may be achieved by configuring the further device 20 to transmit the signals from multiple well defined positions in the coordinate system, e.g., by moving the device 20 to different positions or by providing the device 20 with multiple transmitters for the signals.

Based on the known arrangement of the measurement points MP1, MP2, MP3 on the positioning tag 10, the position and optionally also orientation of the positioning tag 10 is determined. Based on the placement of the positioning tag 10 on the object 30 this is in turn used as a basis for estimating the position and optionally also orientation of the object 30.

It is noted that as an alternative or in addition to using signals transmitted from the device 20 to the positioning tag 10, also signals transmitted from the positioning tag 10 to the device 20 could be used. Results of measurements on signals transmitted from the positioning tag 10 to the device 20 could then be reported back to the positioning tag 10, so that the positioning tag 10 can determine its own position in the coordinate system and also the position of the object 30 in the coordinate system based on the measurements. The reported results of the measurements may include rule measurement results, such as distances evaluated from runtime based measurements, or may also include results obtained by further analysis of measurement results. In some cases, the reported results of the measurements could also include the position, and optionally orientation, of the object 30 as determined from the measurements on the signals.

Figure 3:
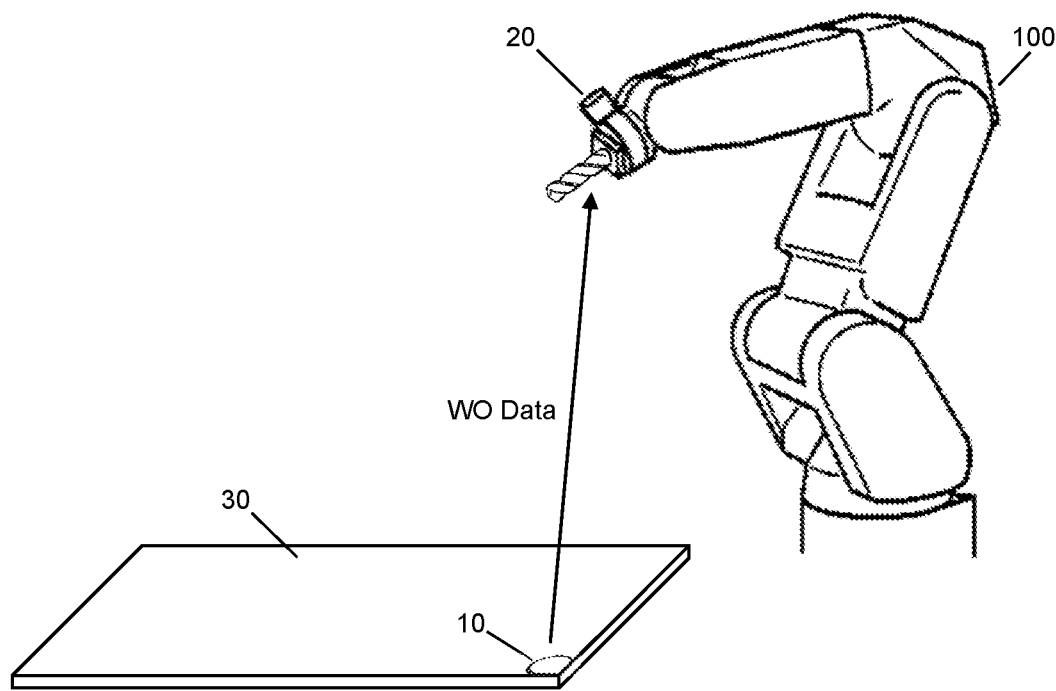
FIG. 3 schematically illustrates an exemplary scenario in which a device according to an embodiment of the invention transmits stored object data.

FIG. 3 shows an exemplary scenario involving an industrial serial robot 100 including the device 20 mounted on a robotic arm of the robot 100. In the example of FIG. 3, it is assumed that the robot 100 is used for processing the object 30 by drilling a hole into the object 30. Accordingly, the robot 100 needs to be configured with data defining the position and orientation of the object 30. Further, the robot 100 also needs to be configured with data describing the geometry of the object 30, e.g., in terms of width, depth, height, or shape. For example, the data describing the geometry of the object 30 could include a three-dimensional model description of the object 30, e.g., as generated by a CAD (computer aided design) or CAM (computer aided manufacturing) system. Still further, the robot 100 needs to be configured with data describing the hole which is to be drilled into the object 30, e.g., in terms of a position of the hole, a size of the hole, a depth of the hole, and a shape of the hole. Further, the robot 100 may need to be configured with a program for con-trolling processing of the object 30.

As mentioned above, the position and orientation of the object 30 is measured on the basis of the signals transmitted between the positioning tag 10 and the device 20 and can then be supplied as input to the robot 100. In accordance with the concept as outlined above, the data describing the geometry of the object 30 and the data describing the hole to be drilled, and optionally also data including the program for the robot 100, are stored as a part of the WO data in the positioning tag 10. The positioning tag 10 transmits the WO data, and by receiving the WO data, the robot 100 can efficiently obtain the data required to perform the desired processing of the object 30. The robot 100 could use the device 20 for receiving the WO data. However, the robot 100 could also be equipped with some other receiver supporting reception of the WO data. The WO data may for example be transmitted by a Bluetooth technology. However, it is noted that other wireless communication technologies could be used as well, e.g., a WLAN (Wireless Local Area Network) technology or a proprietary radio technology.

Figure 4:
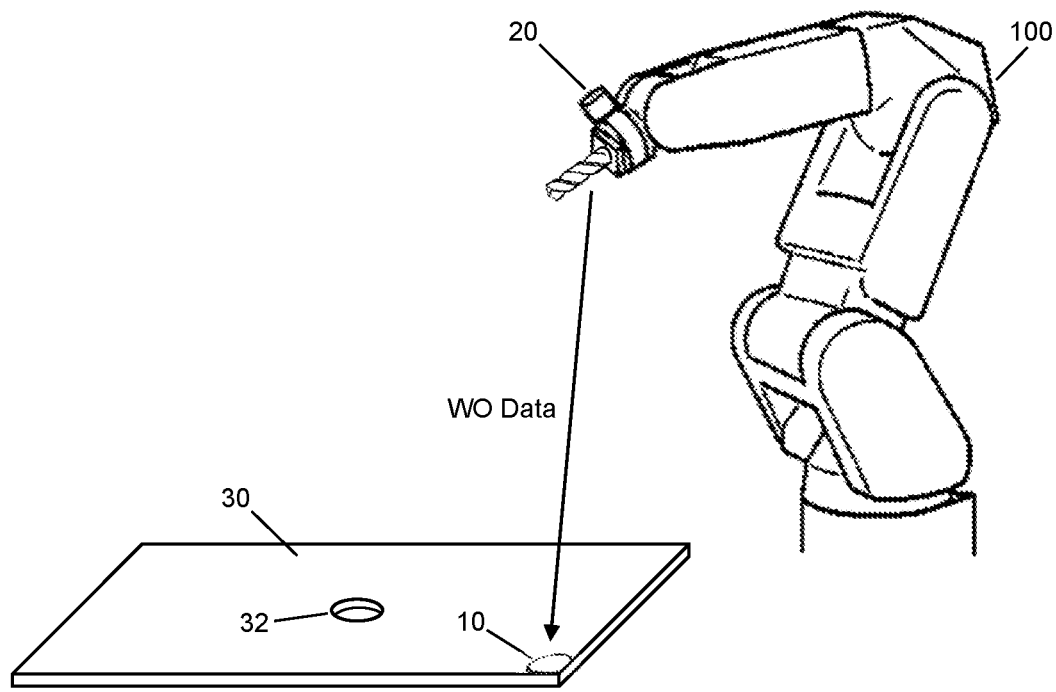
FIG. 4 schematically illustrates an exemplary scenario in which object data are stored a device according to an embodiment of the invention.

FIG. 4 schematically illustrates the situation after processing of the object 30 by the robot 100. In the scenario of FIG. 4, it is assumed that the robot 100 has finished drilling the hole, denoted by reference numeral 32, into the object 30. The robot 100 may then continue with other processing steps on the object 30, or the object 30 may then be transported to another processing site or to storage. Before doing so, the WO data stored in the positioning tag 10 may be updated by transmitting new WO data to the positioning tag 10. Also in this case, the WO data may be transmitted by a Bluetooth technology. However, it is noted that other wireless communication technologies could be used as well, e.g., a WLAN technology or a proprietary radio technology. In the illustrated example, this may involve updating the data describing the geometry of the object 30 with information concerning the hole 32. The updated WO data may then be transmitted by the positioning tag 10 and be used in further processing steps or stages. For example, another robot could use the information on the hole 32 for placing a tool or some other element in the hole 32.

Figure 5A:
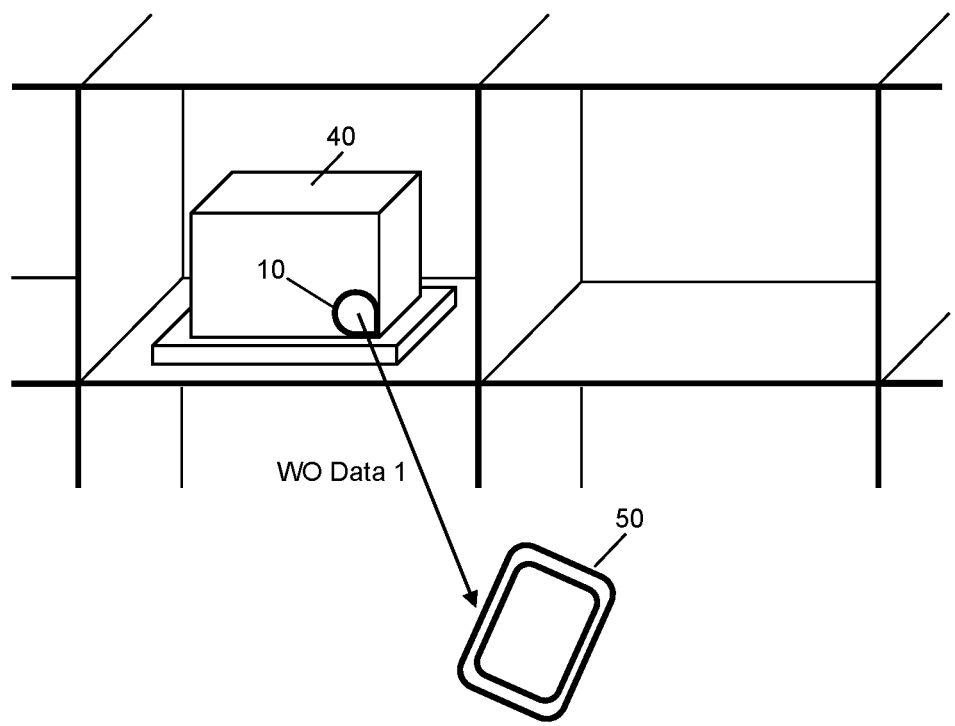
FIGS. 5A and 5B schematically illustrate an exemplary scenario in which a device according to an embodiment of the invention transmits stored object data in a position dependent manner.
Figure 5B:
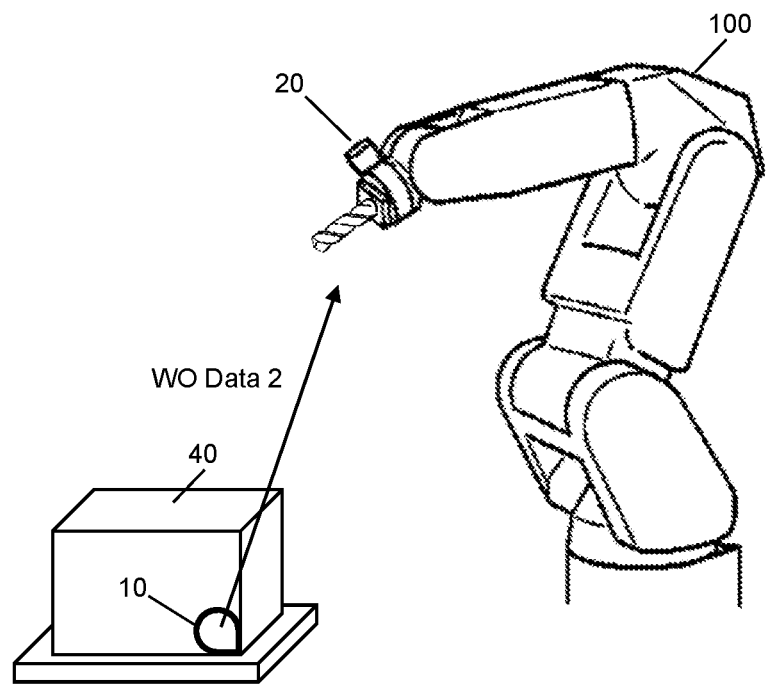

FIGS. 5A and 5B schematically illustrate a further exemplary scenario where the transmission of data stored by the positioning tag 10 is controlled in a position dependent manner. Similar to the above-mentioned scenarios, the positioning tag 10 is placed on an object 40. In the example of FIG. 5A, the object 40 is assumed to be a rectangular box-shaped object, e.g., a part of a housing for an apparatus or the like. As further illustrated in FIG. 5A, the object 40 is placed on a transport pallet and stored in a storage bay of a shelf. Based on the current position of the object 40 as determined on the basis of the measurement of signals, the positioning tag 10 decides to transmit a first subset of the WO data stored in the positioning tag 10 (denoted by "WO Data 1"). The first subset of the WO data may be transmitted by a Bluetooth technology. However, it is noted that other wireless communication technologies could be used as well, e.g., a WLAN technology or a proprietary radio technology.

In the scenario of FIG. 5A, it is assumed that the determined position indicates to the positioning tag 10 that the positioning tag 10 is in a storage facility, and the first subset of the WO data may include data relating to storage of the object 40. For example, this data relating to the storage of the object 40 could include a time or date when the object 40 was stored in the shelf. Further, the data relating to the storage of the object 40 could include an identifier of the storage bay or shelf section in which the object 40 is stored. FIG. 5A further illustrates a reader device 50 which receives the first subset of the WO data. Bases on the received first subset of the WO data, the reader device 50 may then display information to an operator. Further, the first subset of the WO data could be used for controlling a robot to pick up the object 40 from its storage bay. After removing the object 40 from the storage bay, the data related to storage of the object as stored in the positioning tag 10 could be updated, e.g., by storing an indication "in transport" and/or a time of removing the object 40 from storage.

In the example of FIGS. 5A and 5B, it is assumed that the object 40 is then transported from storage to a processing site, where the object 40 is processed by an industrial serial robot 100. In the illustrated example, it is assumed that the robot 100 is used for processing the object 40 by drilling a hole into the object 40. Accordingly, the robot 100 needs to be configured with data defining the position and orientation of the object 40. Further, the robot 100 also needs to be configured with data describing the geometry of the object 40, e.g., in terms of width, depth, height, or shape. For example, the data describing the geometry of the object 40 could include a three-dimensional model description of the object 40, e.g., as generated by a CAD or CAM system. Still further, the robot 100 needs to be configured with data describing the hole which is to be drilled into the object 40, e.g., in terms of a position of the hole, a size of the hole, a depth of the hole, and a shape of the hole. Further, the robot 100 may need to be configured with a program for controlling processing of the object 40.

As mentioned above, the position and orientation of the object 40 is measured on the basis of the signals transmitted between the positioning tag 10 and a further device 20 and can then be supplied as input to the robot 100. In accordance with the concept as outlined above, the data describing the geometry of the object 40, the data describing the hole to be drilled, and optionally also data including the program for the robot 100, are stored as a part of the WO data in the positioning tag 10. Based on the determined position of the object 40, the positioning tag 10 detects that the object 40 now is at the processing site and thus decides to transmit a second subset of the WO data stored in the positioning tag 10 (denoted by "WO Data 2"). Also the second subset of the WO data may be transmitted by a Bluetooth technology. However, it is noted that other wireless communication technologies could be used as well, e.g., a WLAN technology or a proprietary radio technology. The second subset of the WO data includes the data describing the geometry of the object 40 and the data describing the hole to be drilled. However, the second subset of the WO data does not need to include data related to storage of the object 40, as transmitted in the first subset of the WO data. Accordingly, the positioning tag 10 can efficiently transmit the WO data as needed at the current processing site. The robot 100 could use the device 20 for receiving the second subset of the WO data. However, the robot 100 could also be equipped with some other receiver supporting reception of the WO data.

After processing the object 40 by the robot 100, the object 40 may be transported back to storage or to another processing site, the WO data as stored in the positioning tag 10 could be updated, e.g., by updating the data describing the object 40 to reflect the processing in the second subset of the WO data and/or by storing an indication "in transport" in the first subset of the WO data.

In some scenarios, the positioning tag 10 may also use the determined position to detect that the object 40 is currently in transport and control the transmission of the WO data accordingly. For example, while the object 40 is in transport, the positioning tag 10 may transmit only a limited subset of the WO data or even suppress transmission of the WO data in order to keep the WO data or parts thereof confidential.

Figure 6:
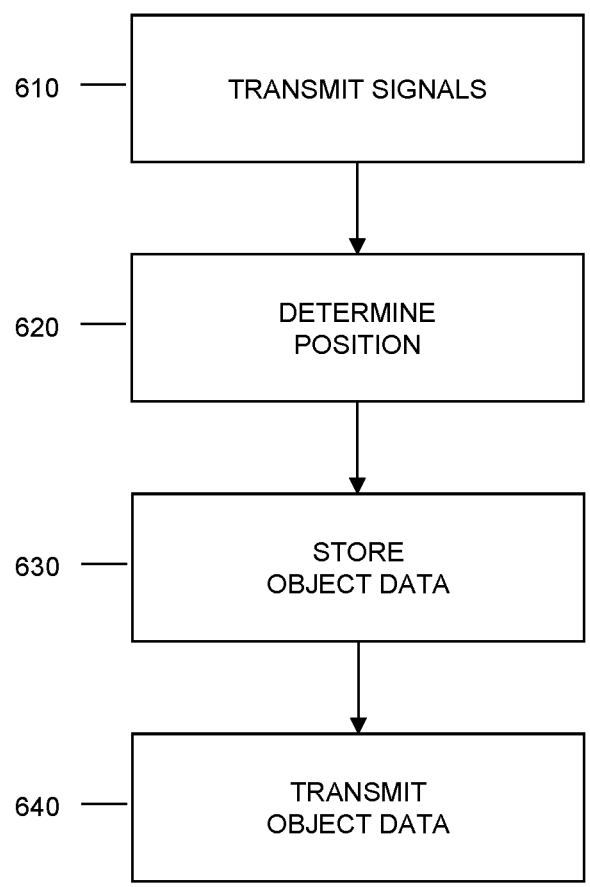
FIG. 6 shows a flowchart for illustrating a method according to an embodiment of the invention.

FIG. 6 shows a flowchart illustrating a method which may be used for supporting handling of an object according to the concepts as described above. The method may for example be implemented by a device which is placed on the object and receives or transmits signals for performing position measurements, e.g., a tag or marker device such as the above-mentioned positioning tag 10. If a processor based implementation of the device is utilized, at least a part of the steps of the method may be performed, controlled, and/or guided by one or more processors of the device.

At step 610, signals are transmitted between a device placed on the object, such as the above-mentioned positioning tag 10, and at least one further device, such as the above-mentioned device 20. The signals transmitted between the device and the further device may include ultrasound signals, radio signals, and/or radar signals. However, it is to be understood that other electromagnetic or acoustic signals could be used as well. The signals may be transmitted from the further device to the device, i.e., the device may act as a receiver of the signals. Alternatively or in addition, the signals may be transmitted from the device to the further device, i.e., the device may act as a transmitter of the signals. In some scenarios, signals from the further device to the device and signals from the device to the further device may also be used in combination.

At step 620, a position of the object is determined based on measurement of the signals transmitted at step 610. This may involve performing run-time based distance measurements, triangulation calculations, and/or trilateration calculations. In some scenarios, also the orientation of the object may be determined based on measurement of the signals transmitted at step 610.

At step 630, data associated with the object are stored in the device. The data may include information on one or more characteristics of the object. Such characteristics may include various physical properties of the object, such as weight, dimensions, constituent material(s). The information on the characteristics of the object could also include a model description of the object, e.g., in the form of a two- or three-dimensional geometric model description, such as a CAD model or CAM model.

Alternatively or in addition, the stored data may include information concerning processing of the object. For example, the information concerning processing of the object may define one or more processing steps to be performed on the object, such as cutting the object, drilling a hole into the object, chemical treatment of the object, assembly of the object with one or more other objects, packaging of the object, or the like.

Alternatively or in addition, the stored data may include data for programming a robot for processing the object. For example, the data for programming the robot could define a sequence of robotic actions which are needed for processing the object.

Alternatively or in addition, the stored data may include information concerning a location of the object. For example, while the object is being stored in a storage facility, the stored data could identify the detailed location within the storage facility, e.g., in terms of a shelf section or storage bay. This may facility picking up the object from storage.

The storing of the data may be controlled depending on the position of the object as determined at step 620. In addition or as an alternative, the data stored in the device may also be updated based on processing of the object. For example, if the position of the object indicates that the object is at a certain processing site, the device may store data related to this processing, e.g., parameters as monitored during the processing, an indication that processing was successfully completed, or fault reports generated during the processing.

At step 640, the stored data are transmitted from the device. For this purpose, the device may utilize various wireless communication technologies and data protocols. For example, the stored data could be transmitted using a Bluetooth technology. The transmitted data may then be received by various kinds of devices or systems which are used for handling the object. For example, the transmitted data could be received by a robot, such as the above-mentioned robot 100, either directly or via another device associated with the robot, such as the above-mentioned device 20. Further, the transmitted data could be received by a reader device which displays information related to the object to a user or operator, such as the above-mentioned reader device 50.

The transmitting of the stored data by the device may be controlled depending on the position of the object as determined at step 620. For example, if the position of the object indicates that the object is at a certain processing site, the device may transmit a part of the stored data which includes information which is to be used as a basis for controlling processing of the object. For example, the transmitted information could then indicate processing steps which are to be performed on the object. In a similar manner, the storing of the data in the device may be controlled based on the determined position of the object. For example, this may involve storing information about processes which have been performed on the object.

The stored data may be organized in multiple data blocks. Depending on the determined position of the object, at least one of the data blocks is selected. The device is then controlled to transmit the stored data from the selected at least one data block. By organizing the stored data in multiple data blocks which are selected in a position dependent manner, the position dependent transmitting and/or storage of information may be implemented in an efficient manner. Further, this may be used for implementing a data security mechanism in which access to certain data blocks is admitted at a first position of the object, e.g., at a processing site, but access to these data blocks is blocked during transport of the object or outside the manufacturer's facilities.

Figure 7:
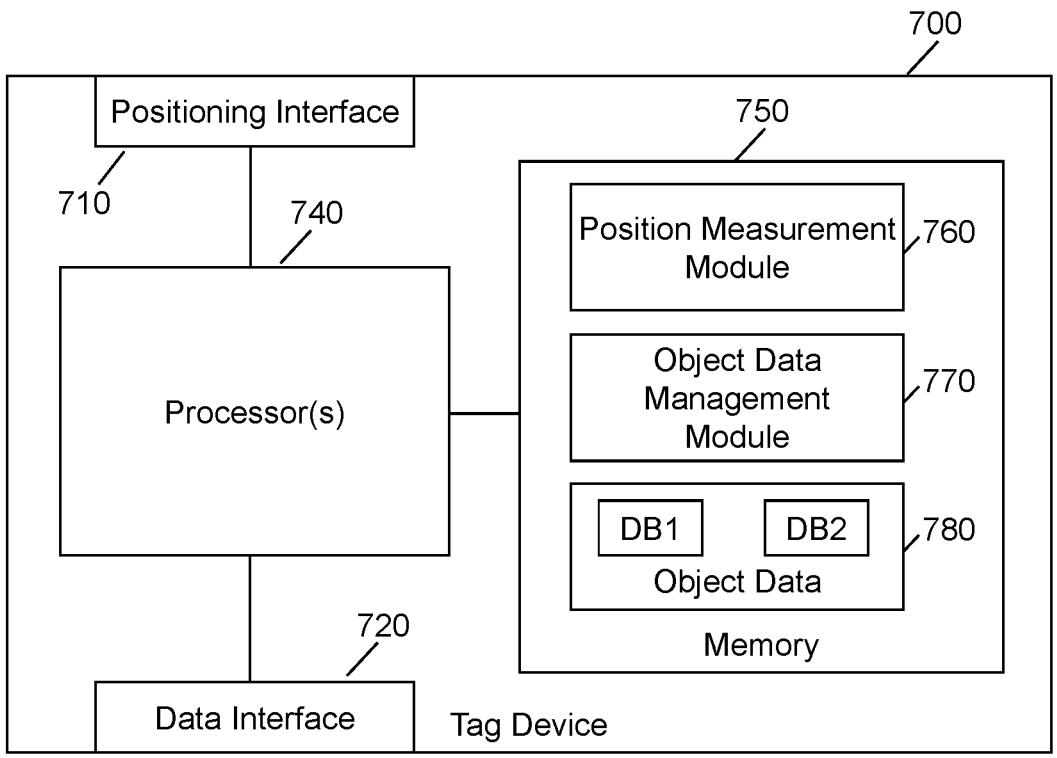
FIG. 7 schematically illustrates a processor-based implementation of a tag device according to an embodiment of the invention.

FIG. 7 shows a block diagram for schematically illustrating a processor based implementation of a tag device 700 which may be utilized for implementing the above concepts. The tag device 700 may for example correspond to the above-mentioned positioning tag 10.

As illustrated, the tag device 700 includes a positioning interface 710. The tag device 700 may utilize the positioning interface 710 for receiving or transmitting signals to be used for position measurements. The positioning interface 710 may support reception or transmission of ultrasonic signals, radio signals, and/or of radar signals. In some scenarios, the positioning interface 710 could also support reception of reports on measurements performed on signals transmitted by the positioning interface 710.

As further illustrated, the tag device 700 is provided with a data interface 720. The data interface 720 may be used for transmitting and/or receiving data associated with an object, such as the above-mentioned WO data. The data interface 720 can be a wireless interface, e.g., a Bluetooth interface or a WLAN interface.

Further, the tag device 700 is provided with one or more processors 740 and a memory 750. The positioning interface 710, the data interface 720, and the memory 750 are coupled to the processor(s) 740, e.g., using one or more internal bus systems of the tag device 700.

The memory 750 includes program code modules 760, 770 with program code to be executed by the processor(s) 740. In the illustrated example, these program code modules include a position measurement module 760 and an object data management module 770. Further, the memory 750 may include object data 780. As illustrated, the object data are organized in multiple data blocks DB1, DB2.

The position measurement module 760 may implement the above described functionalities of performing position measurements based on signals transmitted or received by the tag device 700. The object data management module 770 may implement the above described functionalities of controlling storage of data associated with an object.

It is to be understood that the structures as illustrated in FIG. 7 are merely exemplary and that the tag device 700 may also include other elements which have not been illustrated, e.g., structures or program code modules for implementing known functionalities of a mobile transmitter/receiver device.

Figure 8:
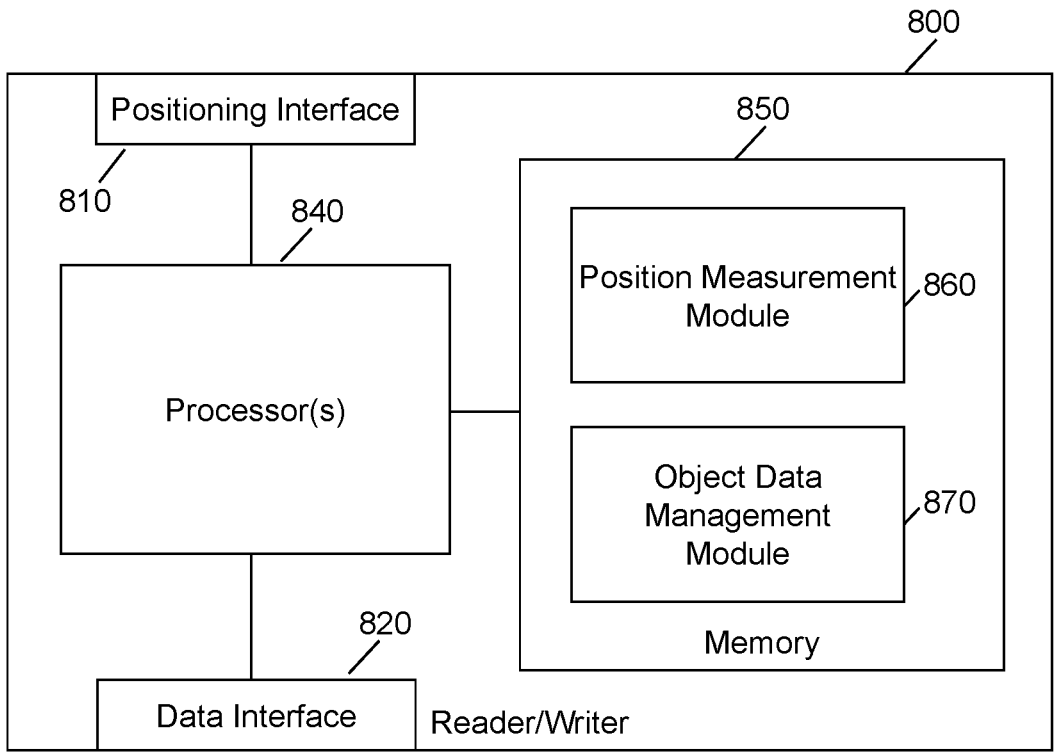
FIG. 8 schematically illustrates a processor-based implementation of a reader/writer device according to an embodiment of the invention.

FIG. 8 shows a block diagram for schematically illustrating a processor based implementation of a reader/writer device 800 which may be utilized for implementing the above concepts. The reader/writer device 800 may for example correspond to the above-mentioned device 50 or may be implemented as part of the above-mentioned robot 100.

As illustrated, the reader/writer device 800 includes a positioning interface 810. The reader/writer device 800 may utilize the positioning interface 810 for receiving or transmitting signals to be used for position measurements. The positioning interface 810 may support reception or transmission of ultrasonic signals, radio signals, and/or of radar signals. In some scenarios, the positioning interface 810 could also support reception of reports on measurements performed on signals transmitted by the positioning interface 810.

As further illustrated, the reader/writer device 800 is provided with a data interface 820. The data interface 820 may be used for transmitting and/or receiving data associated with an object, such as the above-mentioned WO data. The data interface 820 can be a wireless interface, e.g., a Bluetooth interface or a WLAN interface.

Further, the reader/writer device 800 is provided with one or more processors 840 and a memory 850. The positioning interface 810, the data interface 820, and the memory 850 are coupled to the processor(s) 840, e.g., using one or more internal bus systems of the reader/writer device 800.

The memory 850 includes program code modules 860, 870 with program code to be executed by the processor(s) 840. In the illustrated example, these program code modules include a position measurement module 860 and an object data management module 870.

The position measurement module 860 may implement the above described functionalities of performing or supporting position measurements based on signals transmitted or received by a device placed on an object, such as the above-mentioned positioning tag 10. The object data management module 870 may implement the above described functionalities of controlling storage of data associated with an object in such device.

It is to be understood that the structures as illustrated in FIG. 8 are merely exemplary and that the reader/writer device 800 may also include other elements which have not been illustrated, e.g., structures or program code modules for implementing known functionalities of a stationary or portable computer system.

As can be seen, the concepts according to embodiments as explained above allow for efficiently supporting handling of an object by transmitting data associated from a device placed on the object, which at the same time also support measurement of a position of the object.

It is to be understood that the concepts as explained above are susceptible to various modifications. For example, the concepts could be applied in connection with various kinds of robotic, transport, or logistic systems. Further, the concepts may utilize various types of positioning tags or markers, without limitation to the illustrated example of a disk-shaped positioning tag. Still further, it is noted that in some scenarios also multiple positioning tags could be used on the same object.

The invention claimed is:

1. A method of supporting handling of an object during a set of one or more processing steps performed on the object, the method comprising:
storing work object (WO) data in a memory of a device disposed on the object, the WO data comprising information to be used for controlling the handling of the object during the set of one or more processing steps;
transmitting signals between the device disposed on the object and at least one further device;
based on measurement of the signals transmitted between the device and the at least one further device, determining a position of the object;
based on the determined position of the object, controlling, by the device, transmitting a portion of the stored WO data from the device to the at least one further device, the transmitted portion of the stored WO data being representative of a processing step to be performed on the object;
receiving from the at least one further device data representative of one or more processes that were performed on the object; and
updating the WO data stored in the memory with the data representative of the one or more processes that were performed on the object.

2. The method according to claim 1, further comprising:
selecting the portion of the stored WO data transmitted from the device based on the determined position of the object.

3. The method according to claim 2, further comprising:
organizing the stored WO data in multiple WO data blocks,
selecting by the device a first one of the multiple WO data blocks based on a determined first position of the object; and
controlling, by the device, the transmitting to selectively transmit the stored WO data from the selected first one of the multiple WO data blocks based on the determined first position of the object.

4. The method according to claim 3, further comprising:
selecting by the device based on a determined second position of the object different than the determined first position of the object, a second one of the multiple data blocks different than the first one of the multiple data blocks;
controlling, by the device, the transmitting to selectively transmit the stored data from the selected second one of the multiple data blocks based on the determined second position of the object.

5. The method according to claim 1, further comprising:
based on the processing of the object, updating the WO data stored in the device.

6. The method according to claim 1, wherein the storing the WO data comprises storing WO data representative of information on one or more characteristics of the object.

7. The method according to claim 1, wherein the storing the WO data comprises storing WO data representative of information concerning a processing of the object.

8. The method according to claim 7, wherein the storing the WO data comprises storing program data for programming a robot for processing the object.

9. The method according to claim 1, wherein the storing the WO data comprises storing location data representative of a location of the object.

10. The method according to claim 1, wherein the transmitting the signals between the device and the at least one further device comprises transmitting ultrasound signals and/or radio signals between the device and the at least one further device.

11. The method according to claim 1, wherein the transmitting the signals between the device and the at least one further device comprises:
receiving by the device the signals transmitted from the at least one further device to the device.

12. The method according claim 1, wherein the transmitting the signals between the device and the at least one further device comprises:
transmitting the signals from the device to the at least one further device.

13. A device, comprising: a transmitter configured for transmission of signals between the device and at least one further device;
a processor configured to determine, based on measurement of the signals transmitted between the device and the at least one further device, a position of an object being processed on which the device is placed; and
a memory configured to store, based on the determined position of the object being processed, WO data comprising information to be used for controlling the handling of the object during the set of one or more processing steps of the object, wherein the transmitter is configured for transmitting a portion of the stored WO data from the device based on the determined position of the object being processed, wherein the device receives from the at least one further device data representative of one or more processes that were performed on the object, wherein the device updates the WO data stored in the memory with the data representative of the one or more processes that were performed on the object.

14. The device according to claim 13, wherein the transmitter comprises a receiver configured for receiving the data associated with the object to be stored based on the determined position of the object.

15. The device according to claim 13, wherein:

the processor is configured to control the memory to store the WO data associated with the object in the multiple blocks;

the processor is configured to select a first one of the multiple blocks based on a determined first position of the object; and the processor is configured to control the transmitter to transmit stored WO data from the selected first one of the multiple data blocks based on the determined first position of the object.

16. A system, comprising: at least one device; and at least one other device, the at least one device comprising: a transmitter configured for transmission of signals between the at least one device and the at least one other device; a processor configured to determine, based on measurement of the signals transmitted between the at least one device and the at least one other device, a position of an object being processed on which the at least one device is placed; and a memory configured to store work object (WO) data comprising information to be used for controlling handling of the object during a set of one or more processing steps performed on the object, wherein the transmitter is configured for transmitting a portion of the stored WO data from the at least one device, the at least one other device receiving the stored data transmitted by the at least one device and/or providing at least a part of the data to be stored in the at least one device, the at least one further device receiving data representative of one or more processes that were performed on the object, and updating the WO data stored in the memory with the data representative of the one or more processes that were performed on the object.

* * * * *